May 9, 1967     A. R. MORSE     3,317,962
INJECTION MACHINE POSITIVE STOP
Filed March 17, 1965     3 Sheets-Sheet 1
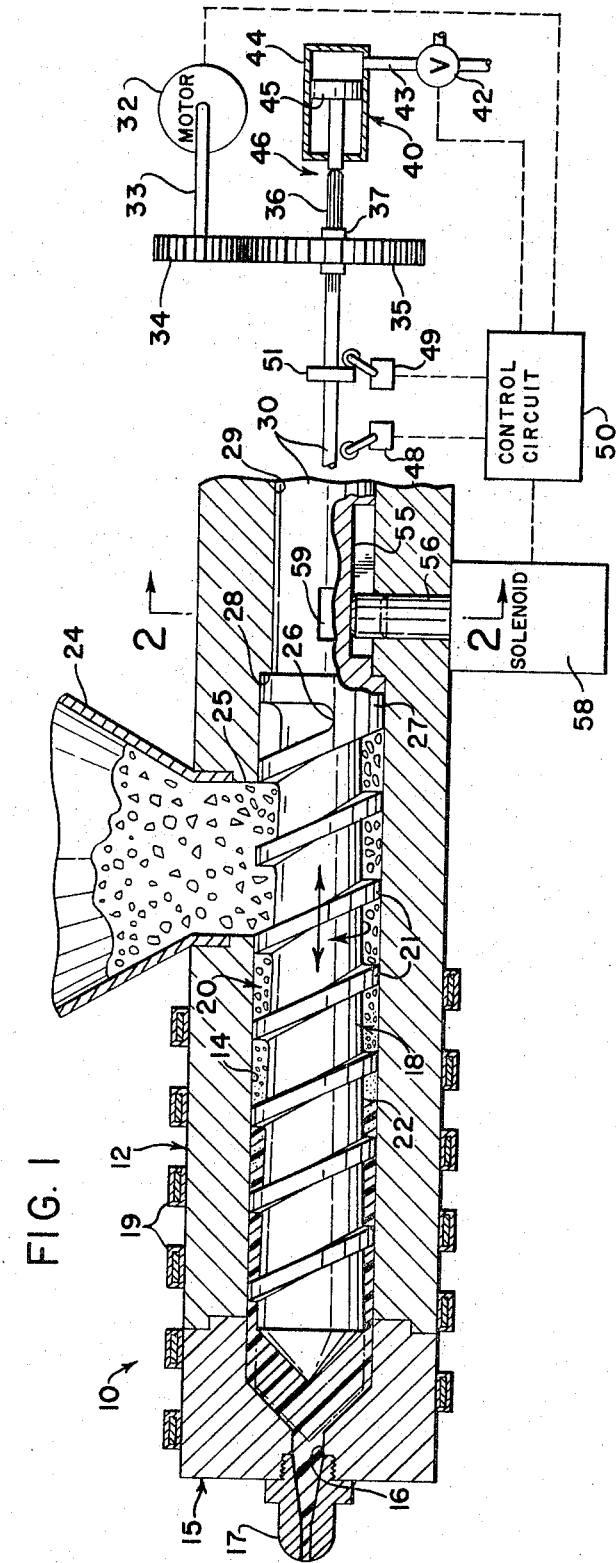
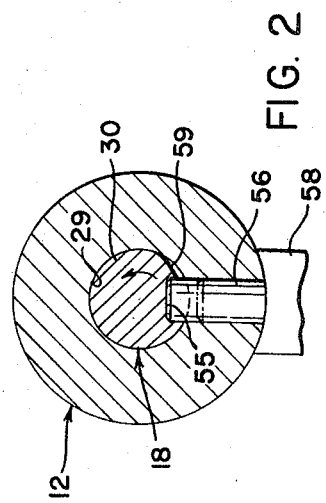
FIG. 2
*INVENTOR.*
ALBERT REYNOLDS MORSE
BY    Fay & Fay
ATTORNEYS May 9, 1967    A. R. MORSE    3,317,962
INJECTION MACHINE POSITIVE STOP
Filed March 17, 1965    3 Sheets-Sheet 2
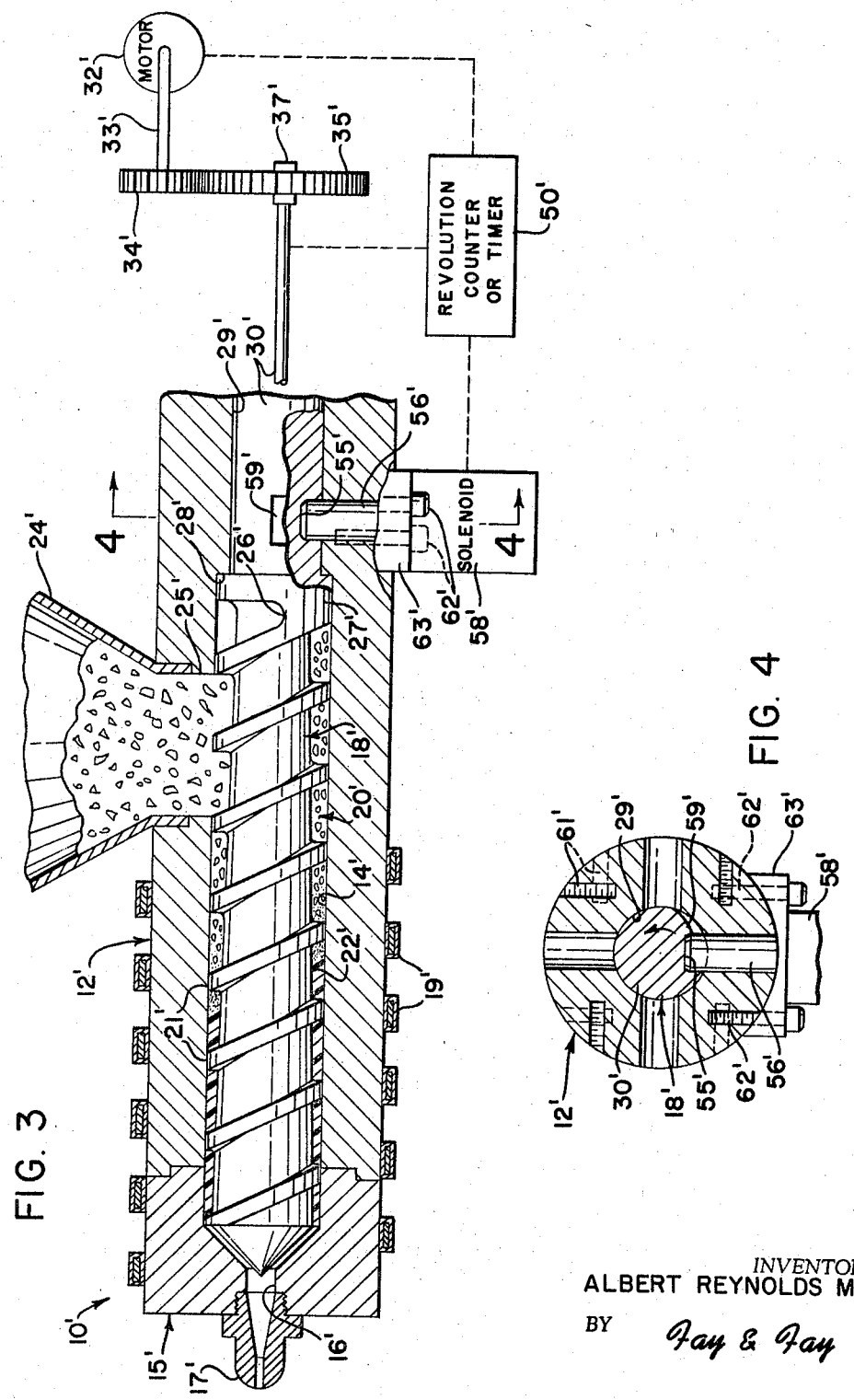
INVENTOR.
ALBERT REYNOLDS MORSE
BY Fay & Fay
ATTORNEYS INVENTOR.
ALBERT REYNOLDS MORSE
BY Fay & Fay
ATTORNEYS 3,317,962
INJECTION MACHINE POSITIVE STOP
Albert Reynolds Morse, Cleveland, Ohio, assignor to Injection Molders Supply Co., Inc., Cleveland, Ohio, a corporation of Ohio
Filed Mar. 17, 1965, Ser. No. 440,514
15 Claims. (Cl. 18—30)

This invention concerns plastic molding devices having intermittently rotating plastifying members and is adapted particularly for use in either temporarily or permanently converting injection machines for more efficient injection molding of thermoplastic materials such as, for example, polyolefines, styrenes, nylons, acrylics, cellulosics, polycarbonates, vinyls and acetals.

Broadly, the invention contemplates a plastic injection molding device which includes an elongated housing means having an axial bore and an end structure having a discharge opening therein. An injection member, usually a screw, is mounted in the bore of the housing means for rotation and defines therewith a tortuous passage in communication with the discharge opening. In communication between a plastic material source and the tortuous passage is a lateral passage for feeding the plastic material into the device. The material source is generally a reservoir for granular plastic material. In connection with the means to rotate the injection member intermittently, a novel means to stop the injection member in a predetermined radial position is provided. It is this novel combination which provides for heretofore unobtainable results in the forming of constant output in plastic injection molding.

The novel means to stop the injection member in a predetermined radial position may be a solenoid actuated member which moves into an opening in the rotating injection member in response to a rotation counter or a timer provided in the machine combination for this purpose. If the injection member is movable axially, the opening is preferably a slot. An ultimative mechanism which may be used is a solenoid actuated single revolution clutch which is capable of disengaging the drive and positively stopping the rotating member in a desired radial position during its final revolution. In any event, it is the positive stopping of the rotating device after a precise number of revolutions at a precise radial location which provides the desired result of uniformly molded parts through the accomplishment of a constant feeding effect without surges.

In all present single or two stage screw plastifying devices having intermittently rotating plastifying screws or other rotating tortuous path defining devices, output or part weight variations have been encountered. Attempts to overcome these undesirable weight, density, and dimensional variations by designing special screw flights and other complex tortuous path defining devices have been costly failures in that they have not proved capable of eliminating molded part weight and other variations.

In the prior art intermittently operating injection screw devices, the screw is started and stopped each cycle and the discharge or output through the discharge opening is variable because the volutes of the screw or injection member is randomly positioned with respect to the lateral feed passage when rotation of the plastifying screw is stopped. The present invention is specifically designed to halt the rotation of the screw at the same point for each cycle such that an opening having a constant cross section area for entrance of the plastic material from the lateral passage into the tortuous passage is provided each time the screw rotation is stopped.

The invention is capable of use on both injection devices having screws which are fixed axially for intermittent rotation or on devices which move intermittently both axially and rotationally. Moreover, the present device does not require a change in the necessary conventional controls for the axial positioning of a reciprocating plastifying member. Accordingly, the various limit switch arrangements and their alternatives which control the axial travel of the plastifying member may also be used in conjunction with the invention.

This invention, when applied to existing reciprocating or axially stationary screws which are rotationally stopped and started during each injection molding cycle, has the effect of producing a uniform weight shot or discharge during each cycle because the screw while it is continuously carrying the plastic forward must always cease its various functions at precisely the same spot, presenting exactly the same dimension of travel of the rotationally moving injection member under the feed slot during each cycle. This results in having the feed screw flights or other injection member volutes urge the same amount of granules of plastic away from the lateral feed passage while the melting flights have urged the same amount of hot material into the final melting zone and the last flight of the screw has discharged precisely the same amount of hot plastic ahead of it because it comes to rest at the same radial position at the end of each cycle. This is in contrast to the present devices where the feed conveying and discharge volutes of a rotating plastifying member can drift to a stop anywhere in their 360° rotational cycle, with consequent variations in melting and feeding rates.

Prior to the invention of the instant positive stop for rotating injection plastifying members, the volutes of the injection members in conventional machines were stopped at any random position depending on the residual torque or varying momentum of drive, the variable drag of plastic on the screw, or other braking factors of a non-positive nature relative to the rotary position of any given point on the periphery of the rotating member. The result of this was that there was obtained an uneven feed, uneven compression or melting, and uneven or irregular discharge of the plastic material from the tortuous path into the holding area where the hot plastic is stored prior to injection.

It will be noted that there is no need for a positive rotational screw stop in the plastic extrusion field because the screw rotates continuously. However, the invention may be utilized on plastic extrusion machines where it is contemplated that they will be subsequently used for injection processes utilizing intermittent screw rotation for lateral sliding of the screw as in some blow molding devices.

With the shortcomings of the prior art intermittently rotated injection devices in mind, it is a general object of this invention to provide an injection molding device which eliminates variations in shot weight from cycle to cycle by stopping the screw in the precise same radial or rotational position during each cycle.

It is a further object to eliminate the extra plastic material costs due to shot molded part variation which have been caused in the past by uneven screw discharge or feed surges.

It is a further object of the invention to eliminate partial fills and other kinds of scrap shots such as flashed or overfilled or off-dimensioned shots by providing that that quantity of plastic material available for injection is constant.

It is a more specific object of the invention to eliminate mold packing or mold flashing which causes sticking of a part in a mold or excess part weight due to the need to carry an oversized cushion of hot melt in the shot chamber between the injection member and the discharge opening the overcome screw discharge variations.

It is an additional object of the invention to provide constant molded part densities, constant strain and constant semi-crystalline or flow patterns in the molded parts thereby to permit existing screw injectors to be used for a broader class of precision molded parts having precise weight, density, and flow patterns.

Other and more specific objects of the invention will be apparent from the detailed description to follow.

In the drawings:

FIG. 1 is a schematic elevational view of an intermittently rotating and intermittently reciprocating injection device constructed according to the principles of the invention with portions of the structure broken away for clarity.

FIG. 2 is a cross sectional view taken along the line 2—2 of FIG. 1.

FIG. 3 is a view similar to FIG. 1 illustrating an intermittently rotating non-reciprocating screw.

FIG. 4 is a cross sectional view taken along the lines 4—4 of FIG. 3.

Figure 5:
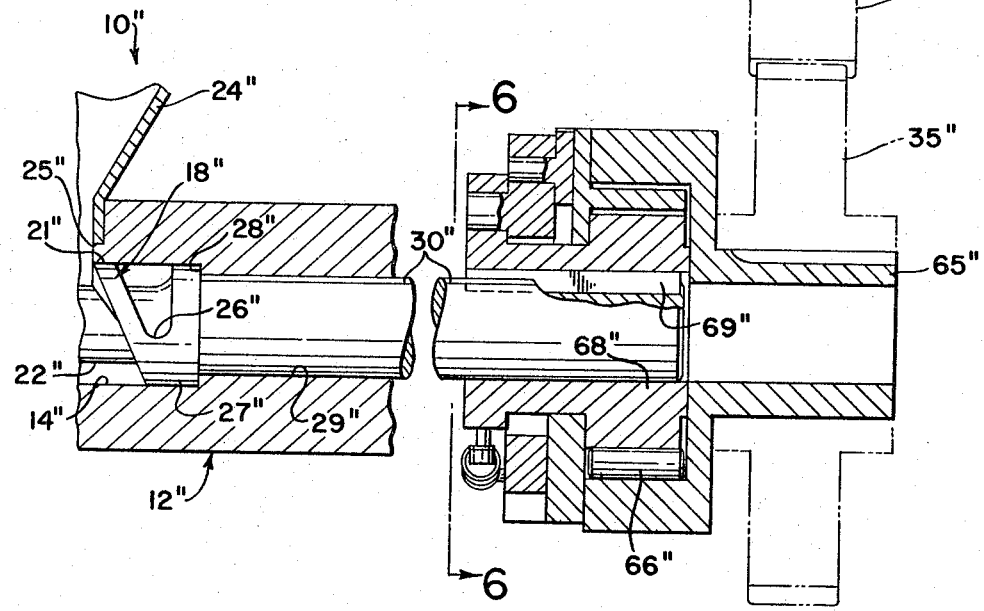
FIG. 5 is a fragmentary schematic elevational view of a modification of the invention utilizing a single revolutionary clutch.

In the embodiment illustrated in FIG. 1 a plastic injection molding device having an intermittently reciprocating and rotating screw is provided according to the principles of this invention with a positive stop means to stop rotation of the screw at exactly the same radial position during each cycle. The plastic injection molding device is generally designated by the numeral 10 and comprises an elongated housing means 12 having a central axial bore 14 and an end cap 15 having a discharge aperture 16 with a nozzle 17 therein. An injection screw 18 is reciprocally and rotatably mounted in the bore 14. The housing 12 is provided with suitable electrical heating means 19 which is in the form of bands of high resistance material. The screw 18 and the bore 14 define a tortuous passage 20 through which plastic material flows during the injection molding cycle. The tortuous or helical path 20 includes flights or volutes 21 and generally cylindrical root portions 22 therebetween.

A material hopper 24 containing granular plastic material is provided in communication with the passage 20 by means of a lateral passageway 25. The passageway 25 is located in the housing structure 12 such that it intersects the bore 14 near the end of the passage 20 opposite the discharge end. As illustrated in FIG. 1, the volutes 21 of the screw 18 end in a cul-de-sac 26 such that a generally cylindrical bearing portion 27 is provided on the screw to act as a bearing in co-operation with the end of the bore 14 near the passageway 25.

A shoulder 28 is provided in the bore 14 such that the bearing portion 27 may bottom on the shoulder 28 when the screw is reciprocated to its rearwardmost portion. The bore 14 has a reduced diameter portion 29 which is separated from its major portion by the shoulder 28 and a reduced diameter shank portion 30 of the screw 18 is suitably dimensioned for rotational and reciprocal movement in relatively tight fitting engagement with the reduced diameter bore portion 29.

In the device of FIG. 1 the screw is rotated by means of an electric motor 32 which drives a shaft 33 having a driving gear 34 mounted thereon. The gear 34 drives a driven gear 35 which is mounted on a shaft 30, or an extension thereof, at a splined portion 36 thereof such that co-operating teeth on the interior of the hub 37 of the gear 35 drive the shaft 30 when the motor 32 drives the shaft 33. Conventional hydraulic drive means schematically illustrated at 40 are provided such that when the flow of hydraulic fluid passes from a valve 42 through a conduit 43 into a cylinder 44 behind piston 45, the mechanical interconnection to the shaft extension 30 of the screw, drives the shaft 30 and the screw 18 forward in an axial direction but rotation of the piston 45 will not occur.

This connection, as shown schematically at 46, is accomplished by the shaft extension 30 being in axial alignment with the exposed portion of the piston 45 without having a rotation transferring coupling thereto. Details of this structure and phase of the operation of the device are described in my copending application, Ser. No. 275,013, filed on Apr. 23, 1963, now abandoned, for a Segmented Injection and Plasticizing Unit. As disclosed in that application, limit switches 48 and 49 actuate a control circuit, generally designated 50 by means of a collar or other suitable means 51 in association with the shaft 30, to trip limit switches 48 and 49 at the extremes of the axial travel of the reciprocating screw 18.

Accordingly, it will be seen that when plastic material fills the hopper 24 and the entire passageway 20, and opening 16, the screw 18 moves to position shown in FIG. 1 and the collar 51 trips the limit switch 49 turning off the motor 32 to stop its rotational drive and the piston 45 by means of a solenoid valve 42 also actuated by switch 49 is moved forward forcing plastic ahead of it out of the discharge opening 16 and the nozzle 17 until the collar 51 trips limit switch 48 and the control circuit 50 is actuated thereby to stop the forward motion of the piston 45 and start the rotational drive by the motor 32.

As the motor 32 rotates then, it drives the driven gear 35 which in turn drives the screw extension 30 through the splined portion 36, and the screw 18 rotates until sufficient material is built up between the nose of the screw 18 and the discharge passage 16 to force the screw 18 backward until it trips the limit switch 49 and the cycle is repeated.

During this cycle, however, in the apparatus as described to this point, there is nothing to insure that the screw 18 stops in the same radial position such that the volutes 21 present exactly the same sized opening into the passageway 20 for receiving the material from the lateral passage 25. Notice, for instance, in FIG. 1 that if the screw 18 had stopped in a position 180° from that illustrated that two volutes would be found in alignment with the lateral passage 25 instead of one as illustrated. It will be seen then that random radial position of the screw at the stopping permits a random sized opening from the passage 20 to be presented for receipt of material from the hopper 24.

Also, variations in the amount of heating and plastifying distance the plastic material must travel, as well as variations in the amount of material which will be discharged from the volute adjacent the discharge end 16, will occur and the variations will be random throughout the series of cycles if the screw 18 is free to stop randomly at any radial position.

Accordingly, FIG. 1 is provided with an opening 55 in the form of an axially aligned slot in the periphery of the screw extension or shank 30 behind the threaded portion of the screw 18 of the volutes. The slot 55 is dimensioned such that it may receive a hardened pin member 56 which may reciprocate into and out of opening 55 in accordance with its actuation by a solenoid 58. The opening 55 preferably is provided with a slightly bevelled or reduced diameter edge 59 which can guide the solenoid or the hardened pin 56 into the opening 55 when the pin 56 is urged toward the axis of the screw by means of the solenoid 58.

The solenoid 58 is connected to the control circuit 50 such that when the collar 51 through limit switch 49 indicates that the desired maximum rearward travel of the screw 18 has been effected, and the motor 32 is de-energized, the solenoid 58 at substantially the same time and by means of the control circuit 50, is energized to advance the pin 56 from the position dotted in in FIGS. 1 and 2 to engage with the periphery of the shank portion 30 wherein it is moved into the opening 55 before one complete revolution thereafter occurs.

In this manner the screw 18 may be stopped at exactly the same radial portion so that the volume of the passage 20 as well as its length and other characteristics will be exactly the same in the following cycle as they were in the cycle before. This insures that a precise output from the nozzle 17 will be obtained in repeated cycles and objectional part weight variations which are expensive in that they waste material and produce scrap and nonuniform parts will be eliminated.

FIGS. 3 and 4 illustrate an embodiment which is a modification of that shown in FIGS. 1 and 2 in that the plastic injection molding device has a nonreciprocating or axially fixed screw. In connection with FIGS. 3 and 4 parts similar to those of the embodiments of FIGS. 1 and 2 are labeled with like numbers primed. Thus, we have the plastic injection molding device with a non-reciprocating fixed screw which is generally designated by the number 10' having a housing 12' with an axial bore 14'.

An end cap 15' is provided having a discharge aperture 16' and a nozzle 17'. An axially fixed intermittently rotatable screw 18' is provided within the housing 12'. As is conventional in the art electrical heating means bands 19' are provided. The axially fixed screw 18' defines a tortuous passageway 20' with the bore 14' by means of its flights 21' and root diameter portions 22' therebetween. The material reservoir 24' is provided in communication with the axial bore 14 by means of lateral passageway 25'. The screw 18' ends in a cul-de-sac 26' and has a cylindrical bearing support portion 27' which co-operates with the bore 14' and a shoulder at the end thereof 28' to hold the screw in proper axial and lateral position within the bore 14'.

A reduced diameter portion 29' of the bore 14' is provided with the shoulder 28' being between the major portion of the bore 14', and the reduced diameter portion 29'. Within the portion of the bore 29' a shank portion 30' of the screw 18' is provided which has a connection with a motor 32' through a shaft 33' and driving gear 34'. The gear 34' engages driven gear 35' rigidly mounted on the shaft extension portion 30' by suitable splined or keyed hub means 37'.

The operation of the embodiments of FIG. 3 is such that no hydraulic actuating means is necessary because the screw 18' does not reciprocate. In this embodiment the cycle of operation is such that when the motor is running and driving the screw through gears 34' and 35', material is discharged from the nose of the screw 18' through the discharge opening 16' and nozzle 17' into the mold, as is well known in the art.

The rotation of the screw 18' continues until a revolution counter, or a timer which is in the control circuit with the motor, stops the motor and accordingly, the rotation of the screw 18' is stopped as well as discharged from the nozzle 17' into the mold. At substantially the same time, the revolution counter or timer shuts off the motor at the predetermined number of desired rotations for an injection shot. For example, the revolution counter could be in the form of a ratchet device permitting nine revolutions before shutting off the motor 32' or it could be in the form of a timer which for a given speed of operation would provide a fixed and predetermined number of rotations. While the rotation is stopped, the part is removed from the mold and the device is ready to rotate and again discharge plastic into the mold.

The operation of the automatic mold and its mechanism of starting the cycle are conventional and are not illustrated because of their wide use in the field of injection molding of plastics.

It will be readily recognized by those skilled in the art that the use of the control setup and limit switches of FIG. 1 could be replaced by the timer or revolution counter of FIG. 3. Such a change does not alter the effect of the solenoid actuated positive stop, however, since in any event it is merely necessary to provide a circuit which when the motor stops, and de-energizes it when the motor starts.

In FIG. 3, for instance, the opening 55' is provided in the form of a hole in the shaft extension portion 30'. It is not necessary that 55' be an elongated slot because there is no reciprocal motion in the screw 18'. The opening 55' receives a hardened pin 56' from bevelled edge 59' upon actuation of a solenoid 58' by means of the revolution counter or the timer counting out or timing out the proper number of revolutions.

Examples of this might be a timer set to run for three seconds during which nine revolutions would occur or a ratchet type of mechanical revolution counter could be employed which would after nine revolutions shut off the motor 32' and actuate the solenoid 58'. After the conventional mold has gone through its cycle, it will energize the motor 32' and through the circuit 50' deactivate the solenoid 58' to remove the pin 56' from the opening 55' and permit the rotation thereof.

FIG. 4 illustrates a manner in which the radial location at which it is desired to stop the screw may be adjusted. It will be seen that this is accomplished by providing a plurality of openings for the pin 56' about the periphery of the housing 12' with threaded holes 61' provided on both sides thereof so that cap screws 62' may be threaded therein to hold the solenoid 58' by means of a bracket 63' of suitable shape. It will be recognized that such an arrangement of adjustability would be capable of use on the embodiment illustrated in FIG. 1 as well as that illustrated in FIG. 4.

Figure 6:
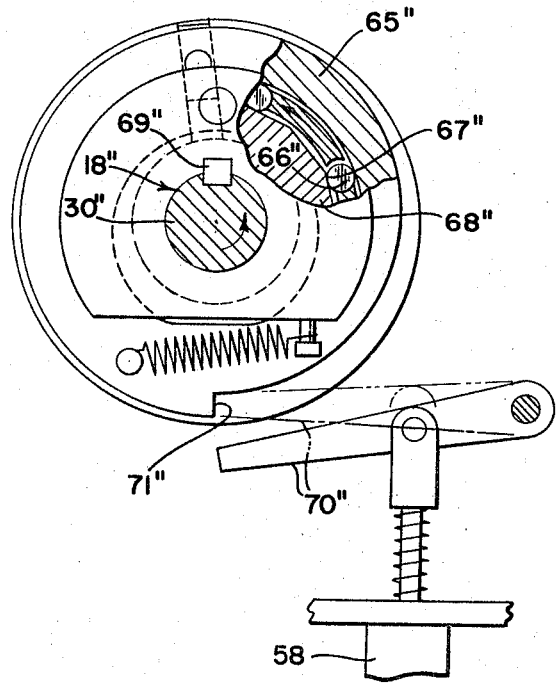
FIG. 6 is a cross sectional view taken along the line 6—6 of FIG. 5.

FIGS. 5 and 6 illustrate another embodiment of the invention wherein a single revolution clutch is utilized. In describing FIGS. 5 and 6 the parts of the embodiment which are equivalent to parts in the earlier described embodiments will be given similar numbers double primed (").

As will be seen, the plastic injection molding device of FIG. 5 is generally designated by the numeral 10" with a housing 12" and an axial bore 14". The shaft extension 30" has no opening in it, but in this embodiment it is not necessary. A driving gear 34" and a driven gear 35" are shown dotted in where they will be drivingly attached to a hub member 65 which drives rollers 66 against projections 67 on a member 68 keyed to the shaft extension 30". When the motor rotates the driving gear 34" which drives the driven gear 35", the hub 65" creates rotary motion through the rollers 66" against the projections 67" and thereby drives the element 68" which drives the shaft through extension 30" by means of key 69".

Upon the motor shutting off, the solenoid 58" actuates a lever 70" against a stop 71" which is eccentrically mounted so as to move the member 68" such that the rollers 66" move into a position away from the projection 67" of the hub 68" whereby they may permit the free rotation of the driving hub 65" with respect to the member 68" and shaft 30".

Accordingly, it will be seen that after the trip cam or lever 70" engages the stop 71" the shaft 30" will continue to rotate in each case for approximately 5° to release the clutch and permit the rollers 66" to rotate freely away from projections 67". The clutch illustrated is not claimed, per se, as being inventive, and a standard Type 6 Hilliard Single Revolution Clutch, as produced by the Hilliard Corporation, Elmira, N.Y., can be used in the manner illustrated in connection with FIGS. 5 and 6.

It is important to notice that whether the hardened pin moving into an opening is used or the single revolution clutch is used that it is the solenoid being actuated by the circuit at the same time the motor shuts off the solenoid being released to withdraw the stop lever or hardened pin when the motor starts that provides the positive stop in both embodiments which enables the uniform part weight to be accomplished.

Thus, it will be seen that the application of the positive stop device to injection molding devices will prevent surges or output variations due to bulk factors, compressions, sheers, trapped gases, melt and viscosity changes, back pressures, etc., and these effects will be minimized and rendered constant since these forces will reach precisely the same peak each cycle and relax precisely the same amount each cycle due to the screw being held precisely in the same spot when it stops during each cycle.

For ease of description of the principles of the invention have been set forth in connection with but a few of the illustrated embodiments and modifications. It is not intended that the illustrated embodiments nor the terminology employed in describing them belimiting inasmuch as variations in these may be made without departing from the spirit of the invention. Rather, I desire to be restricted only by the scope of the appended claims.

I claim:

1. A plastic molding device having a rotating screw which comprises in combination,
   means to rotate said screw intermittently and means to stop said screw in a predetermined radial position.

2. The combination of claim 1 in which the means to stop said screw in a predetermined radial position includes opening means on said screw and a member which is intermittently received in said opening means.

3. The combination of claim 2 in which the member is moved intermittently to be received in said opening means by means which includes a solenoid.

4. The combination of claim 3 in which the opening means has a bevelled edge on its peripheral portion first engaged by the member intermittently received therein.

5. The combination of claim 1 in which the means to stop said screw in a predetermined radial position includes a clutch means.

6. The combination of claim 5 in which the clutch means is a single revolution clutch.

7. The combination of claim 6 in which the single revolution clutch is disengaged by means which includes a solenoid.

8. The combination of claim 1 in which the means to stop said screw in a predetermined radial position is adjustable so as to permit a choice of any one of a plurality of radial positions of the screw to be the predetermined radial position.

9. The combination of claim 1 in which means to reciprocate the screw intermittently are included.

10. The combination of claim 1 in which the means to rotate said screw intermittently are operably controlled by means which determine the number or rotations of the screw before it is stopped by the means to stop said screw in a predetermined radial position.

11. The combination of claim 10 in which the means to determine the number of rotations of the screw is a timer and the means to stop said screw in a predetermined radial position includes a solenoid which is actuated in response to said timer.

12. A plastic injection molding device which includes an elongated housing means having an axial bore and an end structure having a discharge opening therein,
    an injection member mounted in said bore for rotation and defining therewith a tortuous passage in communication with said discharge opening,
    a lateral passage having one end in communication with said tortuous passage and the other end in communication with a material source,
    means to rotate said injection member intermittently and means to stop said injection member in a predetermined radial position.

13. The device of claim 12 in which means to reciprocate the injection member intermittently are included.

14. The device of claim 13 in which the means to stop said injection member includes opening means on said screw and a member which is intermittently received in said opening means.

15. The device of claim 13 in which the opening means is a slot.

References Cited by the Examiner

UNITED STATES PATENTS

| | | | |
|---|---|---|---|
| 3,001,233 | 9/1961 | Ernst | 18—30 |
| 3,188,691 | 6/1965 | Stenger | 18—12 X |
| 3,233,288 | 2/1966 | Strauss | 18—30 |

WILLIAM J. STEPHENSON, *Primary Examiner.*